(12) United States Patent
Diemer et al.

(10) Patent No.: US 6,622,841 B2
(45) Date of Patent: Sep. 23, 2003

(54) CLUTCH DISK

(75) Inventors: Matthias Diemer, Niederwerrn (DE);
Andreas Orlamünder, Schweinfurt (DE); Andreas Dau, Würzburg (DE); Peter Wiggen, Grafenrheinfeld (DE); Johann Spitzhirn, Kolitzheim (DE); Klaus Seemann, Mühlhausen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/923,568

(22) Filed: Aug. 7, 2001

(65) Prior Publication Data
US 2002/0050434 A1 May 2, 2002

(30) Foreign Application Priority Data
Aug. 7, 2000 (DE) .......................... 100 38 410

(51) Int. Cl.[7] .............................. F16D 13/64
(52) U.S. Cl. ................... 192/52.6; 192/107 C
(58) Field of Search ................ 192/52.6, 107 C, 192/107 R, 109 B

(56) References Cited

U.S. PATENT DOCUMENTS

| | | | | |
|---|---|---|---|---|
| 2,566,394 A | * | 9/1951 | Zeidler | 192/107 C |
| 5,076,409 A | * | 12/1991 | Graton et al. | 192/107 C |
| 5,779,017 A | * | 7/1998 | Kleifges et al. | 192/52.6 |
| 5,794,754 A | * | 8/1998 | Villata | 192/107 R |
| 5,857,551 A | * | 1/1999 | Yoneda | 192/107 C |
| 6,102,184 A | * | 8/2000 | Bacher et al. | 192/107 C |
| 6,116,395 A | * | 9/2000 | Ohkubo | 192/52.3 |

* cited by examiner

Primary Examiner—Saul Rodriguez
(74) Attorney, Agent, or Firm—Cohen, Pontani, Lieberman & Pavane

(57) ABSTRACT

A clutch disk includes a hub area and a plurality of friction lining elements, which are supported on the hub area and arranged in sequence in the circumferential direction relative to a clutch disk rotational axis (A). These elements provide at least part of an associated friction surface area, where the friction lining elements are intended to make frictional contact with an associated opposing friction surface of a flywheel, a pressure plate, or the like. At least one friction lining element is supported so that the pressure exerted by its friction surface area against an opposing friction surface can change in response to a change in the sliding frictional interaction between its friction surface area and an opposing friction surface area which is or can be associated with it.

21 Claims, 12 Drawing Sheets

CLUTCH DISK

BACKGROUND OF THE INVENTION

1. Field of the Invention

The present invention pertains to a clutch disk, comprising a hub area and a plurality of friction lining elements, which are supported on the hub area and arranged in sequence around the circumference relative to a clutch disk rotational axis, these elements providing at least part of an associated friction surface area, where the friction lining elements are designed to make frictional contact with an associated opposing friction surface of a flywheel, pressure plate, or the like.

2. Description of the Related Art

In conventional clutch disks, the friction linings, either in the form of individual friction lining elements or ring-like friction linings, are usually attached rigidly to the hub area with rivets, for example. It is also known that the friction linings or individual elements thereof can be attached by way of so-called lining springs to the hub area, so that, when engaging and release operations are carried out, an axial elasticity within the clutch disk is obtained, which has a supportive effect especially during release operations. When, in friction clutches equipped with clutch disks of this type, local changes occur in the frictional conditions as a result of, for example, a local change in the coefficient of friction, a corresponding change occurs in the torque being transmitted by the clutch disk, even though no change is made in the position of the clutch by the release mechanism during the time that the clutch is slipping.

SUMMARY OF THE INVENTION

It is the task of the present invention to provide a clutch disk which can compensate for local changes in the frictional conditions while the clutch is slipping.

According to the invention, at least one friction lining element is designed so that the contact pressure of at least certain parts of its friction surface area against an opposing friction surface can change, at least in response to a change in the sliding frictional interaction between its friction surface area and the opposing friction area which is or can be associated with it.

The present invention takes advantage of the knowledge that the clutch torque $M_K$ transmitted by a friction clutch equipped with this type of clutch disk is a function of various physical variables such as the coefficient of friction $\mu$, the normal force $F_N$ acting between the two surfaces rubbing against each other, the mean friction radius r of the friction surfaces, and the number z of pairs of friction surfaces which are rubbing against each another. This relationship is expressed by the following equation:

$$M_K = \mu \cdot z \cdot r F_N$$

When now, for example, a change in the sliding frictional interaction occurs, such as that which may be caused by a change in the coefficient of friction at various points around the circumference, such a change, e.g., possibly an increase, can be compensated according to the invention by a change in the contact force exerted by at least one friction lining element or its friction surface area. Such a change in the contact force has the result that the normal force $F_N$ acting between the surfaces rubbing against each another decreases at certain points and thus, for example, an increase in the coefficient of friction $\mu$ is compensated by a decrease in the normal force $F_N$.

The indicated change can be obtained by connecting the minimum of one friction lining element to the hub area by a support element, which is itself supported on one of the circumferential ends of the friction lining element. When there is a change in the sliding frictional interaction, a force is generated with the participation of the support element which tries to push at least certain parts of the friction lining element away from the opposing friction surface. For this purpose it can be provided, for example, that the part of the support element between the point where it is connected to the hub area and the point where it is connected to the minimum of one friction lining element curves in the axial direction toward the opposing friction surface which is or can be associated with it. To avoid excessive axial load on the support elements, it is proposed that two friction lining elements, the friction surface areas of which point essentially in opposite axial directions, are supported against each other. This can be realized, for example, in that the support elements of two friction lining elements with friction surface areas which point in different axial directions are supported against each other at the ends pointing away from the connection with the hub area.

An arrangement which in particular is equally effective in both directions of torque transmission, that is, in both directions of relative rotation, can be obtained by connecting at least one circumferential end of the support element to the hub area with freedom of movement in the axial. To avoid secondary bending while making this axial movement possible, it is proposed that at least one circumferential end of the support element be connected to the hub area with freedom of movement in the circumferential direction Another possibility of providing for the axial displacement of a surface of at least one friction lining element, i.e., for a change in the contact force, consists in connecting the support element to the hub area in such a way that it can swivel and/or undergo elastic deformation in the area between its connection to the hub area and the friction lining element, and by offsetting the friction surface area axially relative to the connection between the support element and the hub area in the direction toward an opposing friction surface which is or can be associated with it.

It can also be provided that a plurality of friction lining elements arranged in sequence in the radial or circumferential direction is carried on the support element. The axial displacement of a friction lining element, i.e., of its surface area, can also be achieved by supporting the support element on the hub area by way of a sliding wedge device, so that it can shift position in the axial direction.

An especially simple design can be obtained by supporting the two support elements of two friction lining elements with friction surface areas facing in opposite axial directions elastically against each other, each one being pretensioned in the axial direction toward an opposing friction surface which is or can be associated with it, and by providing each support element with at least one wedge surface, which cooperates with an associated opposing wedge surface on the hub area in such a way that, at least when there is a change in the sliding frictional interaction with at least one of the two friction lining elements, at least certain areas of the support element of the one friction lining element can shift axially toward the support element of the other one of the two friction lining elements.

According to another embodiment which is especially easy to construct but very reliable and certain in its operation, the axial movement can be further enabled by supporting the minimum of one friction lining element on the hub area by way of an elastic support mass. For this purpose, it is possible for the minimum of one friction lining element to comprise a plurality of friction lining element parts, which extend away from the support element both axially and circumferentially, the axial ends of these parts forming at least part of the friction surface area, parts of the elastic support mass being provided between them.

According to another alternative embodiment, the minimum of one friction lining element can be provided with a plurality of projecting friction areas for frictional interaction. The preferred design in this case is for the minimum of one friction lining element to have a lining of friction material, on which a plurality of frictional projections are formed, which are arranged in sequence in the circumferential and/or radial direction. As an alternative, however, it is also possible for the minimum of one friction lining element to have a plurality of separately formed friction material elements arranged in sequence in the circumferential and/or radial direction. These friction material elements can be designed in the form of lips or bumps.

To prevent the normal force from falling below a certain minimum value, a device for limiting the movement in the axial direction can be provided. An axial stroke-limiting device such as this ensures that the axial displacements induced when the contact or normal force decreases cannot exceed a certain value, so that, regardless of the prevailing frictional relationships, a certain minimum normal force always remains in effect.

So that primarily local changes in the frictional relationships can be taken into account, it is proposed that the contact force of the minimum of one friction lining element or of a group of friction lining elements have the ability to change essentially independently of the other friction lining elements or groups of friction lining elements.

According to another aspect, the present invention pertains to a friction lining assembly for a friction clutch or the like, comprising at least one friction lining element with a plurality of projecting frictional areas designed for frictional interaction.

In this embodiment, it is also possible in particular to provide, for example, a continuous element in the form of a ring as the friction lining element. In this case, the area of the individual frictional projections is or can be deformable in order to obtain the previously described local differences in the interaction with the opposing friction surface.

The present invention also pertains to a friction clutch with a clutch disk according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 2:
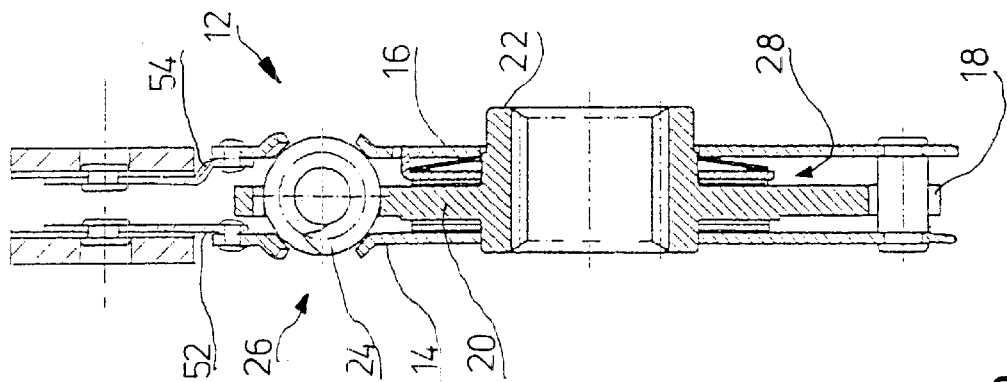
FIG. 2 shows a sectional view of the clutch disk along line II—II of FIG. 1.
Figure 1:
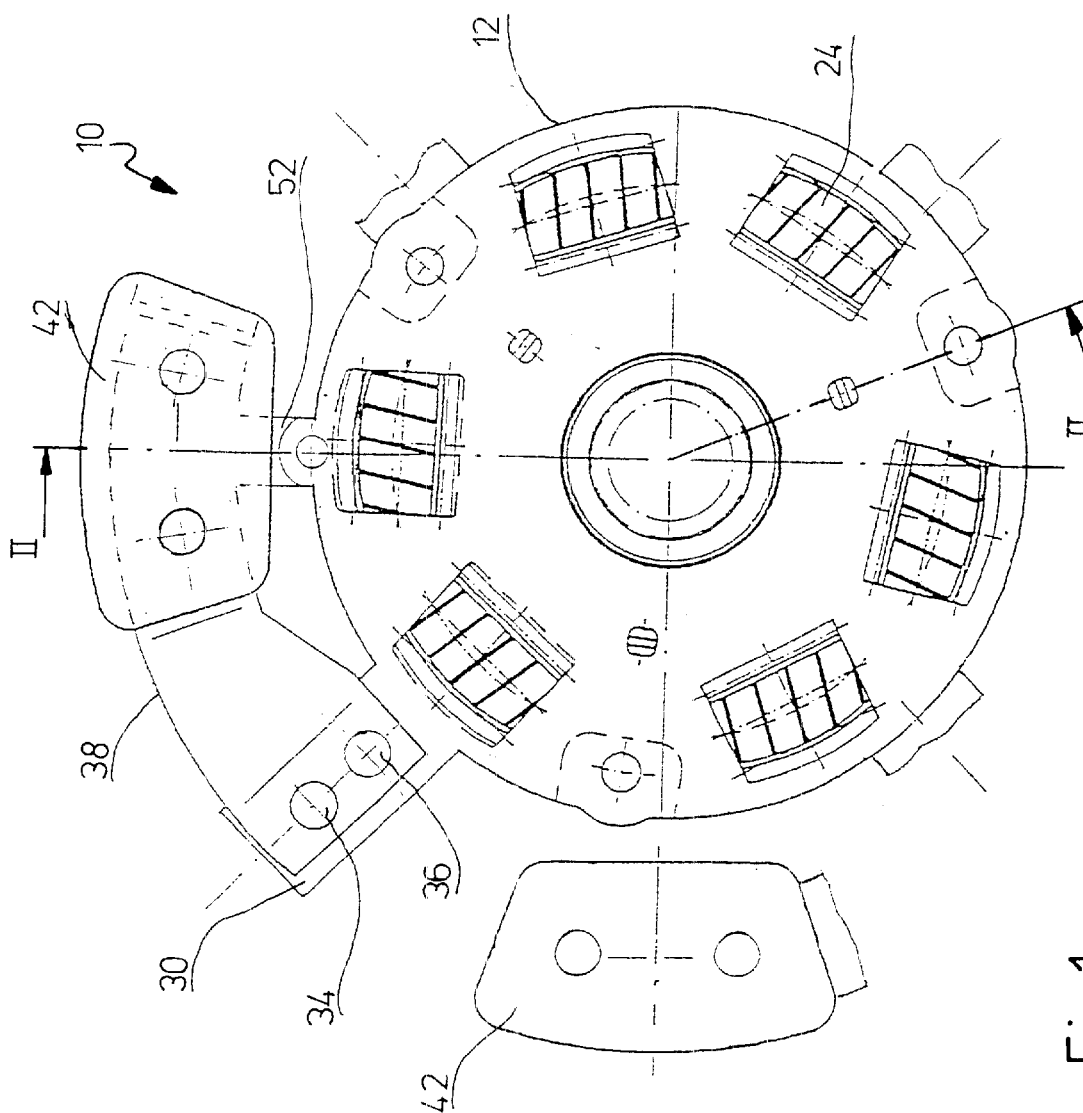
FIG. 1 shows a partial axial view of a first embodiment of a clutch disk according to the invention.
Figure 3:
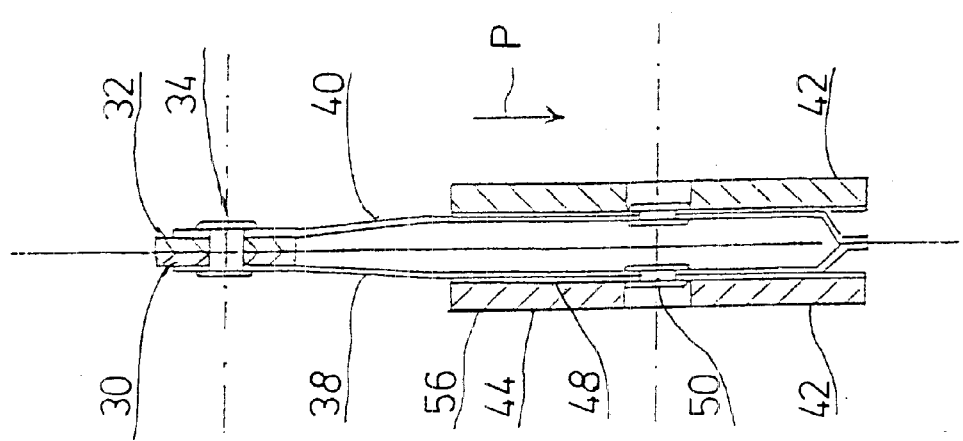
FIG. 3 shows a partial radial view, looking in from the outside, of a clutch disk according to the invention.

FIGS. 1–3 show a first embodiment of a clutch disk 10 according to the invention. The clutch disk 10 comprises a hub area 12 which is designed with two cover disk elements 14, 16, which are a certain axial distance apart and rigidly connected to each other by clinch bolts 18 or the like. Axially between the two cover disk elements 14, 16 is a central disk element 20, the inside radial part of which is connected to, and possibly forms an integral part of, a hub 22. The hub 22 is designed so that it can be connected to a shaft, possibly a transmission input shaft, in nonrotatable fashion. Damper springs 24, which are installed in spring windows in the cover disk elements 14, 16 and in the central disk element 20, act between the cover disk elements 14, 16 and the central disk element 20 and are supported in the circumferential direction by associated guiding edges. In this way, a torsional vibration damper 26 is obtained in the clutch disk 10. In addition, a friction damping device 28 acts between the cover disk elements 14, 16 and the central disk element 20.

In the radially outer area of the hub area, that is, in the radially outer area of the cover disk elements 14, 16, these disk elements have radially outward-projecting connecting tabs 30, 32 at several points on their circumference, which are bent toward each other in the axial direction and which are rigidly connected to each other by several clinch bolts 34, 36. Support elements 38, 40, which extend essentially in the circumferential direction, are connected by these same clinch bolts to the two axial sides of the tabs 30, 32. The axial sides of these support elements 38, 40 facing away from each other carry friction lining elements 42, which comprise essentially a friction lining 44 on a support part 48. The support parts 48 are then joined by clinch bolts 50 or the like to the associated support elements 38, 40. At the ends pointing away from the connection to the tabs 30, 32, the two support elements 38, 40 are bent toward each other and support each other at this point.

It can be seen especially in FIG. 3 that, in the area between the connection to the tabs 30, 32 and the connection to the friction lining elements 42, the support elements 38, 40 are bent or curved in the axial direction, so that, starting from the tabs 30, 32, they extend farther away from each other, which means that each of the support elements 38, 40 is bent toward the friction surface which opposes it (not shown). The result of this is that the support elements 38, 40 are farther apart axially in the areas carrying the friction lining elements 42 than they are in the areas connected to the tabs 30, 32. It can also be seen in FIG. 1 that, approximately in the areas where they carry the friction lining elements 42, the support elements 38, 40 are also connected via radially inward-projecting connecting sections 52, 54 to the associated cover disk elements 14, 16 by rivets or the like to provide the friction lining elements 42 with radial support toward the outside. Connecting the friction lining elements 42 to the hub area 12 in this way offers the advantage that the ends of the friction lining elements 42 closer to the connecting tabs 30, 32 in the circumferential direction are pressed more strongly against the opposing friction surface than the ends farther away from tab areas 32, 30 in the circumferential direction.

It should also be pointed out here that the friction lining elements 42, i.e., their friction linings 44, can be made of sintered material, of ceramic material, or of some other friction material and that they can be glued, riveted, soldered, or connected in some other way to the support parts 48. For example, they can be sintered together with them directly or compressed together with them.

If a change in the frictional relationships occurs as a result of, for example, a local change in the coefficient of friction while a clutch disk 10 designed in this way is slipping, i.e., a change which leads to an increase in the frictional interaction between the friction surfaces 56 of the friction lining elements 42 and the opposing friction surfaces, what happens first is that the friction lining elements 42 are carried along with greater force in the circumferential direction, as indicated by, for example, the arrow P in FIG. 3. Because of the curved sections of the support elements 38, 40, this stronger force has the effect of exerting a stretching effect on the friction lining elements 38, 40. This stretching effect in the area of at least one of the support elements 38, 40 has in turn the effect of generating an additional force, which tries to push this friction lining element attached to the support element in question away from its associated opposing friction surface. This means ultimately that the force with which this friction lining element, or at least certain areas of it, presses against the opposing friction surface decreases. In the extreme case, the sections of the support elements 38, 40 next to their connection to the tabs 30, 32 will approach each other, as a result of which the friction surfaces 56 of the two friction lining elements 42 will also approach each other in these areas. This means, however, that, as a result of the movement of the surface 56 of the two friction lining elements or at least of one of the friction lining elements in the axial direction, that is, essentially at a right angle to direction P in FIG. 3, the sliding surface 56 of the corresponding friction lining element 42 moves away from the associated opposing friction surface, and the contact force, which corresponds to the normal force, is reduced, at least in a certain area of the sliding surface 56. A decrease in the contact or normal force, however, has the result of compensating for the increase in the coefficient of friction $\mu$, so that the torque transmitted by the clutch remains at an approximately uniform value. Because several of these friction lining elements 42, each capable of axial displacement in response to changes in the frictional relationships, are provided around the circumference, each of which can produce this decrease in the contact or normal force, and because these elements can execute this axial movement independently of each other, changes, especially local changes, in the frictional relationships can be compensated.

It is especially advantageous in this embodiment that the area of the friction lining elements 42 located toward the forward edge with respect to the rubbing direction and therefore closer to the connection between the support elements 38, 40 and the tabs 30, 32 experiences a greater decrease in its contact force or moves even farther away from the opposing friction surface than the area of the friction lining elements farther away from the forward edge does.

Figure 6:
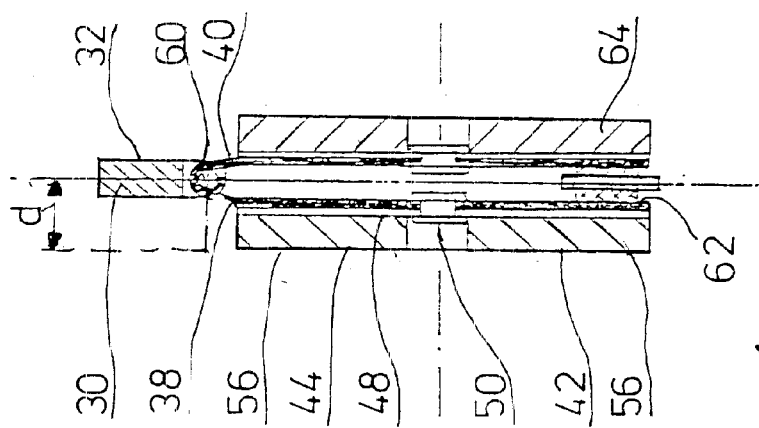
FIG. 6 shows a view of the clutch disk shown in FIGS. 4 and 5 looking in from the outside.
Figure 5:
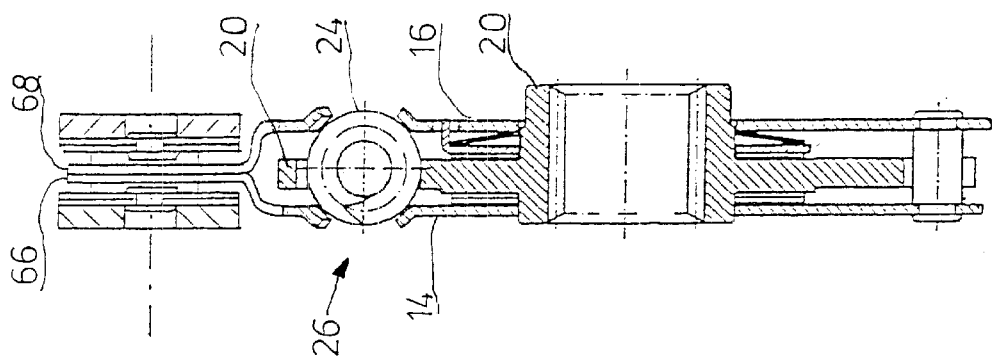
FIG. 5 shows a sectional view along line V—V of the clutch disk shown in FIG. 4.
Figure 4:
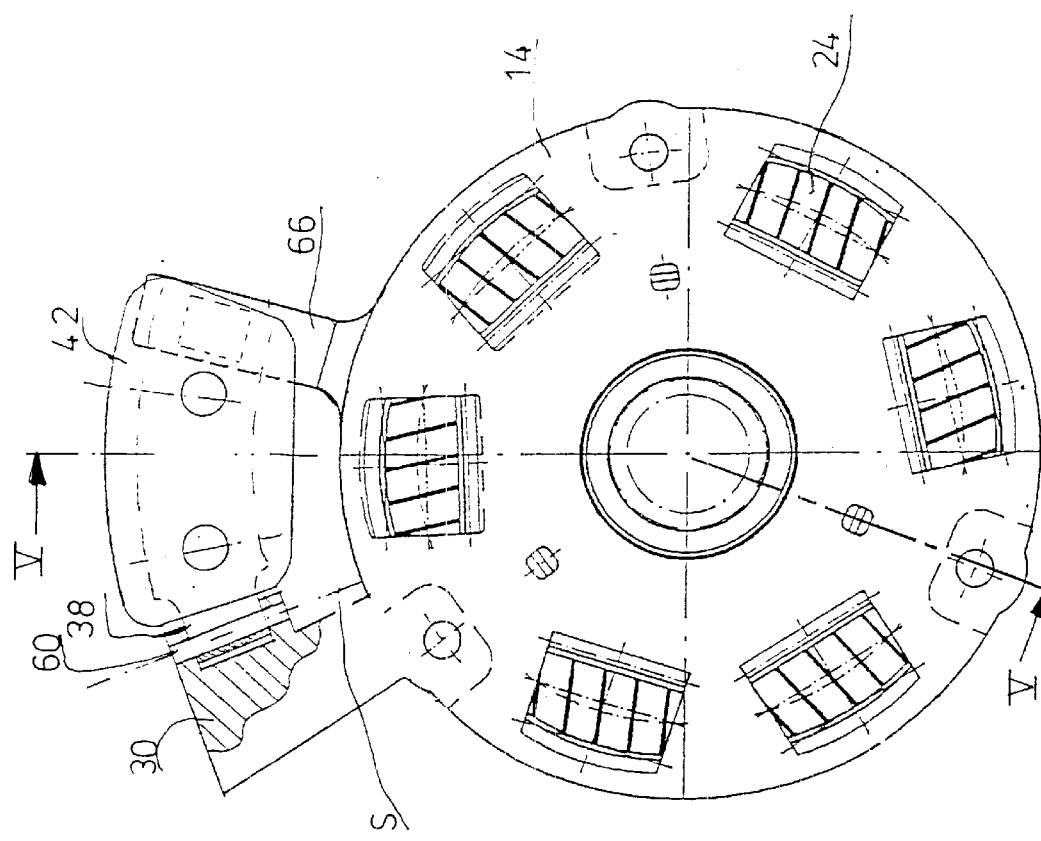
FIG. 4 is a view similar to that of FIG. 1, showing a modified design of the clutch disk according to the invention.

A modified embodiment of the clutch disk according to the invention is illustrated in FIGS. 4–6. It can be seen here that the support elements 38, 40 are connected to the tabs 30, 32 not by rivets but rather by swiveling joints. For this purpose, a swivel axis element 60 is provided on the tabs 30, 32 for each pair of friction lining elements 42. This swivel axis element extends approximately in the radial direction, and the two friction lining elements 42 are supported on it by their support elements 38, 40 with the freedom to swivel. The two support elements 38, 40 are preferably supported on the swivel axis element 60 so that they can swivel independently of each other. The ends of the support elements 38, 40 pointing away from the connection to the tabs 30, 32 are supported in the axial direction by layers of elastic material 62, 64 on radially outward-projecting support projections 66, 68 of the cover disk elements 14, 16. In principle, it would also be possible for this type of support projection to proceed from only one of the cover disk elements 14, 16; in this embodiment and also in the one described previously, it would also be possible to provide only one connecting tab extending from only one of the cover disk elements 14, 16 instead of two tabs 30, 32.

If local changes in the friction relationships occur again while the clutch is slipping, changes which lead, for example, to an increase in the frictional interaction between at least one of the friction lining elements 42 and the opposing friction surface, then, as a result of the axial distance d between the friction surface 56 of the corresponding friction lining element 42 and the swiveling connection between the associated support element 38 and the hub area 12, a torque is produced, which acts on the friction lining element 42 in the direction away from the opposing friction surface or even swivels it around the swivel axis S defined by the associated swivel axis part 60. In the case of the friction lining element 42 shown on the left in FIG. 6, this would be a swiveling in the counterclockwise direction, with the result that the entire friction surface area 56 of the friction lining element 42 would move away from the opposing friction surface in the axial direction. Because the two adjacent friction lining elements 42 are supported independently on the sections 66, 68, a decrease in the contact force of one of the friction lining elements 42 does not simultaneously lead to an increase in the contact force of the other friction lining elements.

Like the deformation of the elastically deformable support elements 38, 40 in the previously described embodiment, the deformation of the elastic materials 62, 64, which can be, for example, an elastomeric material vulcanized in place or designed as elastic components such as springs of known design (helical compression springs, leaf springs), also has an elastic or damping effect in the present embodiment.

Figure 7:
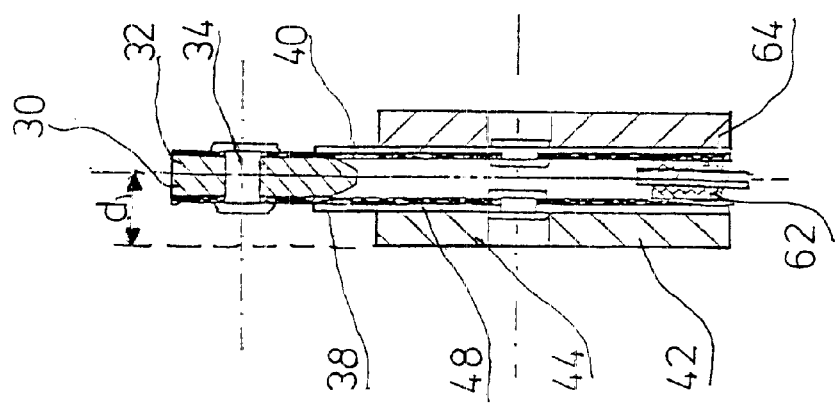
FIG. 7 is a view similar to that of FIG. 6, showing a modified embodiment.

FIG. 7 shows a modification of this embodiment, in which the two support elements 38, 40 are again riveted to the tabs 30, 32. The tabs 30, 32 have a contour at their circumferential ends which tapers down in the circumferential direction, so that here the two support elements 38, 40 can be deformed in the circumferential direction in the area adjacent to the tabs 30, 32. Here, too, as a result of the distance d, a change in the frictional relationships causes a torque to be produced, as a result of which a force acts on the one or both friction lining elements 42 in the direction away from their opposing friction surfaces or possibly even pushes them away from the opposing surfaces in the axial direction. In any case, the result again is a decrease in the normal force acting between the surfaces rubbing against each other.

Figure 9:
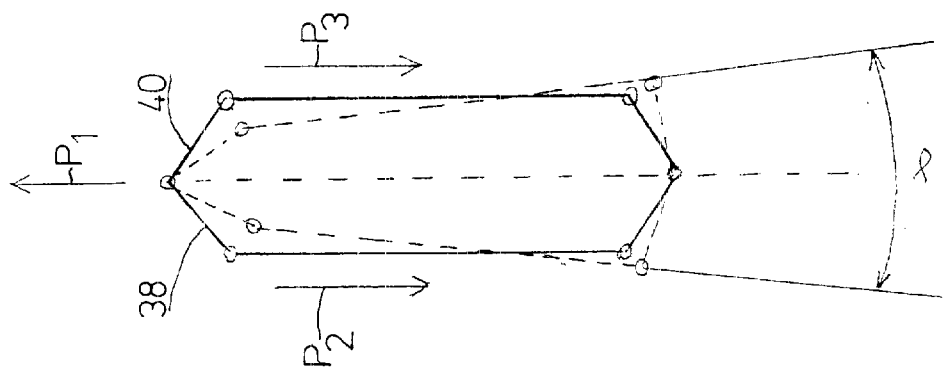
FIG. 9 shows a schematic function diagram, which illustrates the principle by which the embodiment shown in FIG. 8 works.
Figure 8:
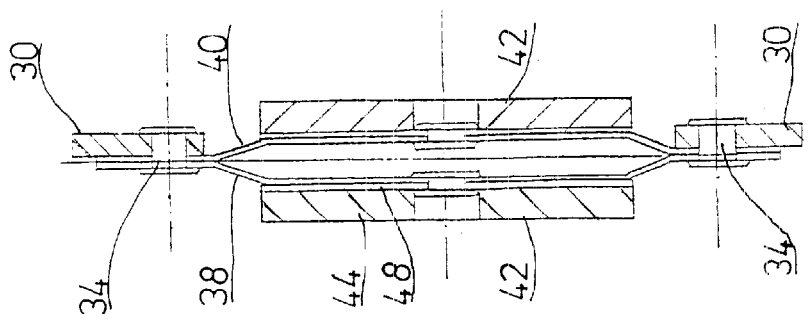
FIG. 8 shows another partial radial view of a clutch disk according to the invention, looking in from the outside.

Another modification of the clutch disk according to the invention is shown in FIG. 8. It can be seen here that the two circumferential ends of the two support elements 38, 40 of the friction lining elements 42 are rigidly attached to a connecting tab 30 of the hub area 12. Between these two areas of rigid attachment, the support elements 38, 40 are again bent in the axial direction toward the opposing friction surfaces, and in the exemplary embodiment shown here they have an approximately trapezoidal configuration. When the clutch is slipping and the clutch disk moves in the direction of arrow P1 in FIG. 9, for example, relative circumferential movement of the friction lining elements with respect to the hub area occurs in the direction of arrows P2, *P3. As a result of the stretching effect thus exerted on the support elements 38, the area of these elements located toward the leading edge with respect to the friction direction are brought closer together or pretensioned toward each other, with the result that the contact force of the friction lining elements 42 against the opposing friction surfaces decreases. In the trailing area, a spreading effect occurs, i.e., the forces try to move the friction lining elements away from each other, with the result that the contact force is increased here. This is favorable for the sake of suppressing the vibrations caused by variations in the coefficient of friction.

Figure 10:
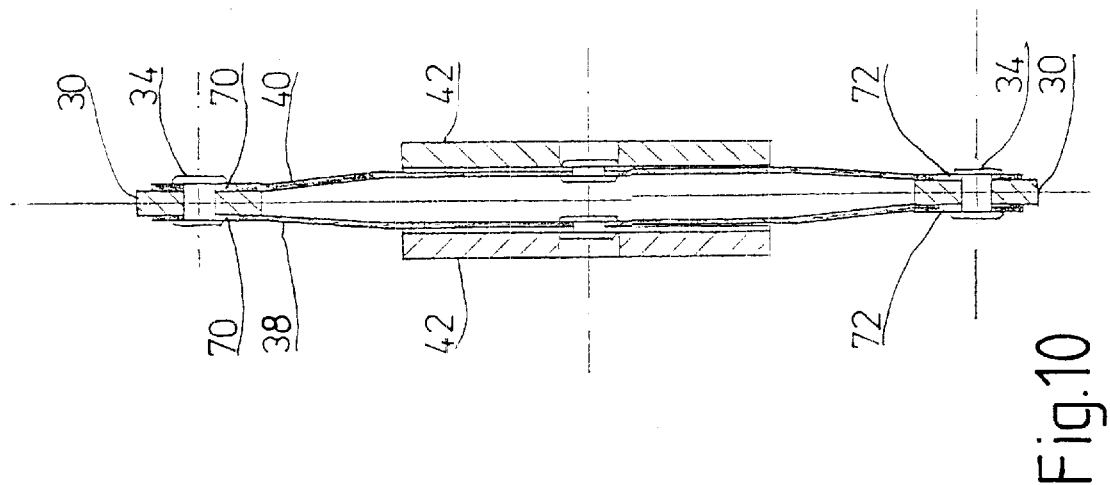
FIG. 10 is a view similar to that of FIG. 8, showing another modified embodiment.

In the embodiment shown in FIG. 10, the circumferential ends of the support elements 38, 40 are connected via slots 70, 72 to one or more connecting tabs 30 and possibly 32 of the hub area 12. Here, therefore, a connection which allows movement in the circumferential direction is present, so that, when we consider the diagram of FIG. 9 again, we see that a force acts on the leading parts (relative to the friction direction) of the support elements 38, 40 so as to bring them closer together, and thus the contact force of the friction lining elements 42 is decreased, but no spreading effect occurs in the rear area, because there the slots 72 in the support elements 38 allow these elements to shift position relative to the clinch bolt 34. To obtain a secure hold here, the area of the clinch bolts 34 which cooperates with the tabs 30 can be press-fit into an associated opening in the tabs 30.

Figure 11:
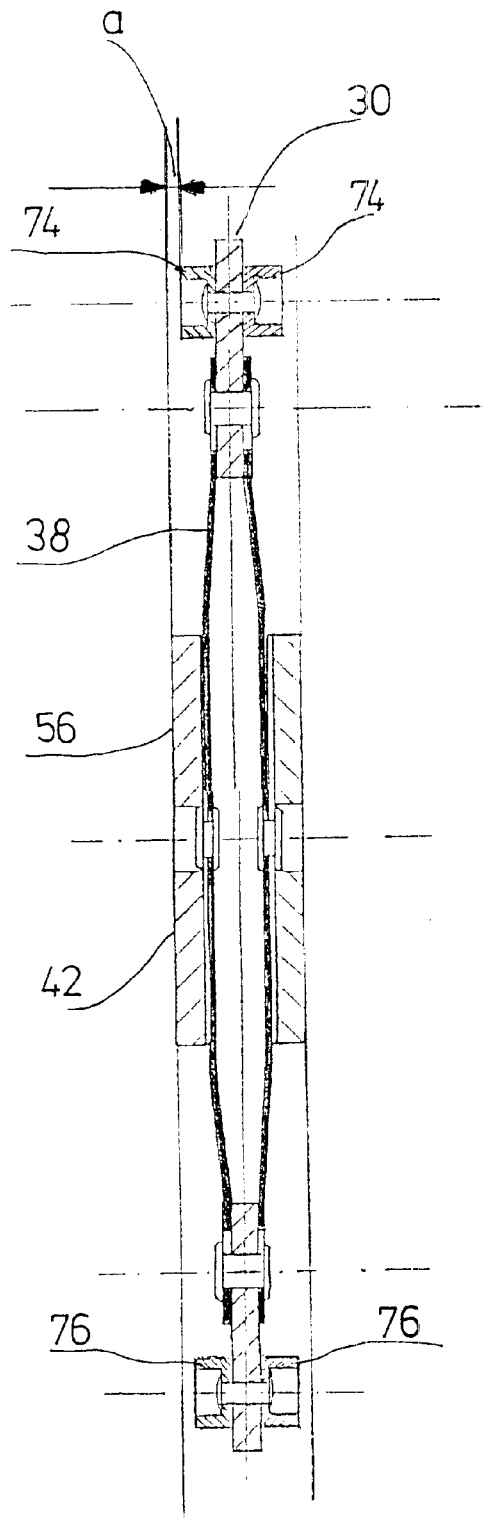
FIG. 11 is a view similar to that of FIG. 8, showing another modified embodiment.

FIG. 11 shows an embodiment which is essentially the same as that described with reference to the embodiment of the FIG. 10. Here, however, spacers 74, 76 are also provided on both axial sides of the connecting tabs 30. When not under load, these spacers are set back by a distance a from the associated friction surface 56 of a friction lining element 42. When the effect described above occurs, i.e., when, as a result of a local change in the frictional relationships, for example, the support element 38 is stretched and thus the contact force of the supported friction lining element 42 is decreased, then, in compensation, the hub area 12 and thus also the spacers 74, 76 carried on it move toward the opposing friction surface. When the contact force has decreased to the maximum allowable extent, the spacers 74, 76 come to rest against the opposing friction surface, so that no further change can occur in the contact force. This guarantees that the friction lining element 42 will always contact the opposing friction surface with a certain minimum required force. So that the friction lining elements 42 produce essentially the entire frictional effect, the spacers 74, 76 are preferably made of a material with a low coefficient of friction, or they can even consist of rolling elements, which roll along the opposing friction surface. This design is designed primarily to compensate for heat-induced changes in the frictional relationships extending over the entire friction surface area and has the result that the contact force being exerted by all of the friction lining elements against the opposing friction surface is ultimately decreased accordingly and that the above-mentioned axial movement of the hub area can occur.

Figure 12:
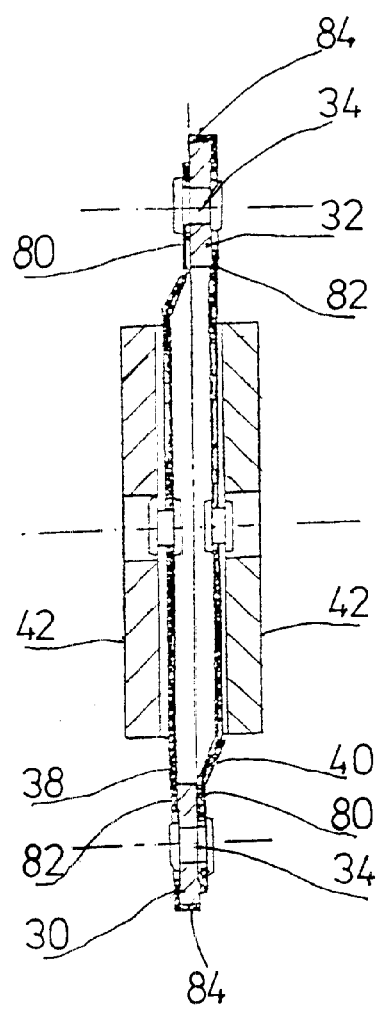
FIG. 12 is a view similar to that of FIG. 8, showing another modified embodiment.

FIG. 12 shows an embodiment in which a first circumferential end 80 of each of the two support elements 38, 40 of the friction lining elements 42 adjacent to each other in the axial direction is connected rigidly by a clinch bolt 34 to one of the connecting tabs 30 or 32, whereas the other end 82 of each of the support elements 38, 40 again has a slot-like opening, which, in cooperation with the head of the clinch bolt, provides a movable connection. Proceeding from their circumferential ends 80, the support elements 38, 40 are again curved in the axial direction toward an opposing friction surface, so that the stretching effect discussed above can again lead to a decrease in the contact force of the friction element in question. So that, when there is a change in the relative rotation between the friction lining elements 42 and an opposing friction surfaces, it is ensured that the curved areas are not excessively deformed, the ends 82 of the support elements 38, 40 are provided with hook-like support areas 84, which can come to rest in the circumferential direction against the tabs 30, 32 and thus provide a carry-along interaction in the circumferential direction between the support element 38 or 40 in question and one of the connecting tabs 30, 32.

It can therefore be seen in the diagram of FIG. 12 that, depending on the direction of relative rotation, one of the two friction lining elements can act to decrease its contact force when changes occur in the frictional relationships.

So that the connecting tabs 30, 32 can also be held axially at the ends 82 of the support elements 38, 40, the clinch bolts 38 can be made somewhat longer in the axial direction here and, by way of an intermediate axial support washer, ensure that, without detriment to the ability of these ends 82 to move in the circumferential direction, they are nevertheless securely held axially on the connecting tabs 32, 30.

Figure 13:
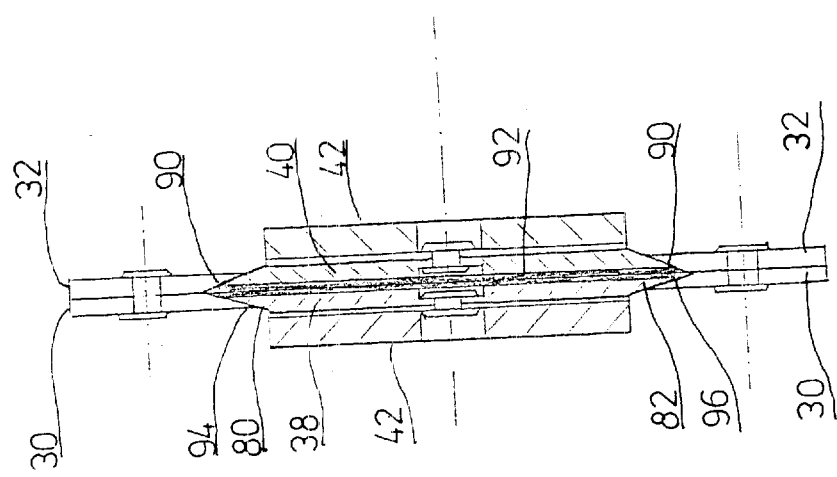
FIG. 13 is a view looking radially in from the outside, showing a clutch disk according to the invention with axially movable friction lining elements.

FIG. 13 shows another type of embodiment of a clutch disk according to the invention, i.e., of the connection of the friction lining elements to the hub area. It can be seen that here the ends of the two connecting tabs 30, 32 of the hub area which are resting against each other are beveled on the side facing their associated friction lining elements 42 and thus form a wedge-shaped recess 90, which is open in the circumferential direction and tapers down in the direction away from the friction lining elements 42. The circumferential ends 80, 82 of the support elements 38, 40, which are designed with a complementary beveled wedge shape, fit into these wedge-shaped recesses. Between the two support elements 38, 40, a layer of elastomeric or elastic material 92 is provided, by means of which the two support elements 38, 40 and thus also the two friction lining elements 42 are pretensioned away from each other in the axial direction. The beveled or wedge-shaped surface areas 94, 96 of the support elements 38, 40 are thus pretensioned into a defined position against the inside surface of the recess 90.

When a local change in the coefficient of friction occurs such as an increase in the frictional interaction, the friction lining element shown on the left with respect to the connecting tabs 30, 32 in FIG. 13, for example, is carried along in the circumferential direction. The wedge-shaped surface of the support element 38 in the trailing position relative to the sliding direction will, during this movement, move along the associated inside surface of the recess 90 and thus be displaced in the axial direction toward the other support element 40, where simultaneously the elastomeric material 92 is compressed. Thus, in the trailing area relative to the sliding direction, the friction lining element 42 will shift slightly in the axial direction, which means that the force it exerts on the opposing friction surface will be decreased. If similar changes in the friction relationships occur simultaneously at both associated friction lining elements 42, then under compression of the elastomeric material 92, both support elements 38, 40 will obviously shift in the axial direction toward each other. The elastomeric or elastic material 92 provides an elastic absorption or damping effect during this displacement. This material can also consist of, for example, an encased granulate such as sand.

Figure 16:
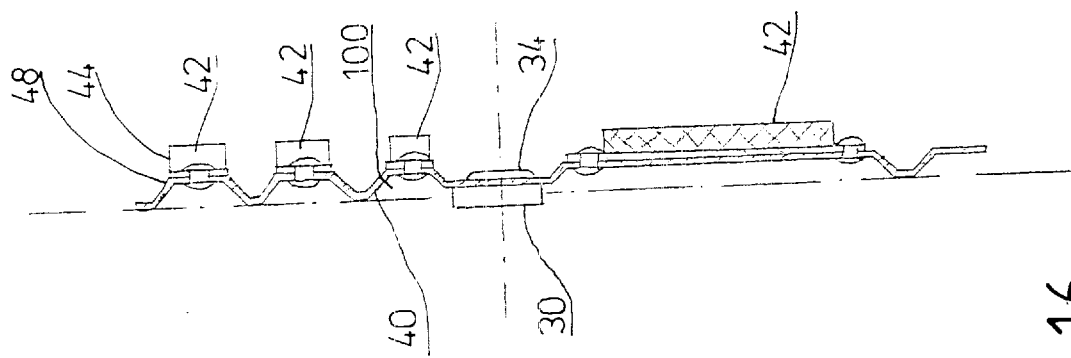
FIG. 16 is a view, looking radially in from the outside, of the friction lining assembly of the clutch disk shown in FIG. 14.
Figure 15:
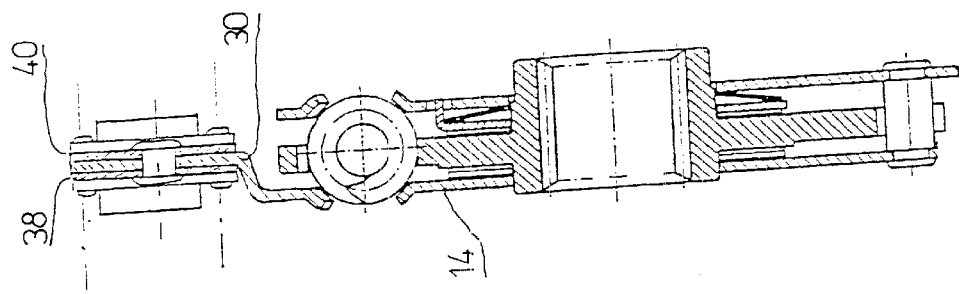
FIG. 15 is a sectional view of the clutch disk along line XV—XV of FIG. 14.
Figure 14:
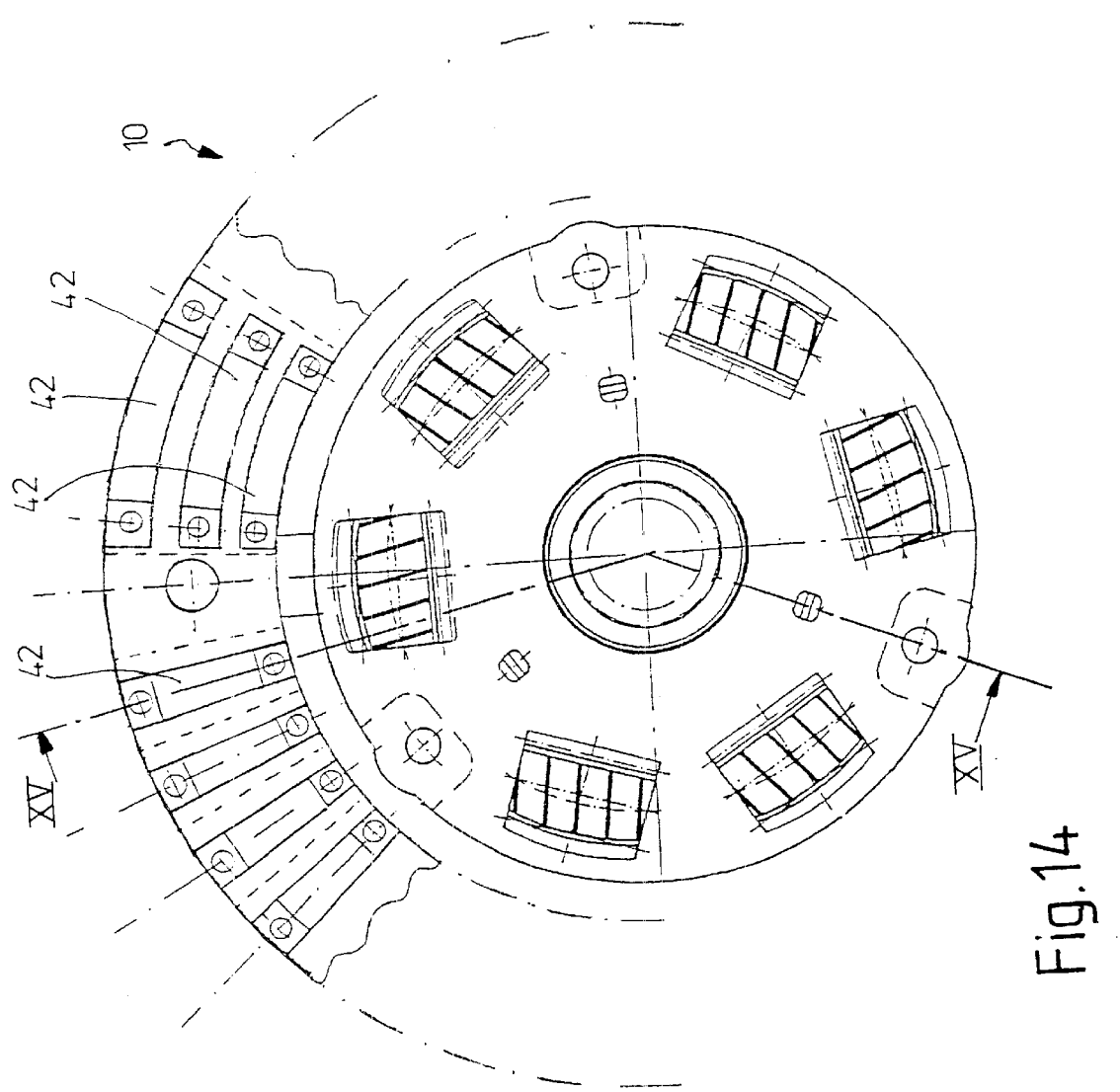
FIG. 14 shows a partial axial view of an alternative embodiment of the clutch disk according to the invention.

FIGS. 14–16 show another design of a clutch disk 10 according to the invention.

On the cover disk element 14, i.e., on the connecting tabs 30 projecting radially outward from it, circular ring-like support elements 38, 40 extending in the circumferential direction are fixed in place by rivets, etc. It can be seen in the upper part of FIG. 16 that the support elements 38, 40 have an undulating shape in the circumferential direction and that they carry friction lining elements 42, extending essentially in the radial direction, on the sections which appear as the crests of the waves from the viewpoint of the opposing friction surface. These elements may again include a friction lining 44 carried on a support part 48. Each of the friction lining elements 42 can be fixed in place on the associated support element 40 by rivets, for example. This type of design is also shown on the left in FIG. 14. In an alternative design, the friction lining elements 42 extend not in the radial direction but rather in the circumferential direction as groups of friction lining elements 42, as can be seen in the lower part of FIG. 16 and on the right in FIG. 14. Between the individual friction lining elements 42 extending in the radial direction or between the groups of friction lining elements 42 extending in the circumferential direction, certain areas of the support elements 38, 40 again curve toward an opposing friction surface as a result of the undulating shape. A change in the frictional relationships, e.g., an increase in the coefficient of friction, leads again to the stretching effect in the area of the support elements as explained above, with the result that, in the crest areas close to the opposing friction surface, a slight axial movement is produced, i.e., the force which the friction lining elements exert against the opposing friction surface is decreased.

It should be pointed out that, in this embodiment, the support elements 38, 40 can also be assembled from several segments arranged between the connecting tabs 30.

The design according to FIGS. 14–16 offers the significant advantage that the suspension of the friction lining elements 42 as a single unit provides a high degree of axial elasticity, so that inaccuracies in the area of the opposing friction surfaces or wobbling movements can be compensated. In addition, the individual friction lining elements can also be designed differently from each other with respect to their mass, their material, their pitch diameter, their number, their arrangement, and their geometry in order to arrive at a specific type of frictional behavior. It should also be pointed out that an elastic material such as an elastic foam can be cast or foamed into the empty spaces 100 present between the support elements 38, 40 resting against each other in order to provide a damping effect there.

Figure 17:
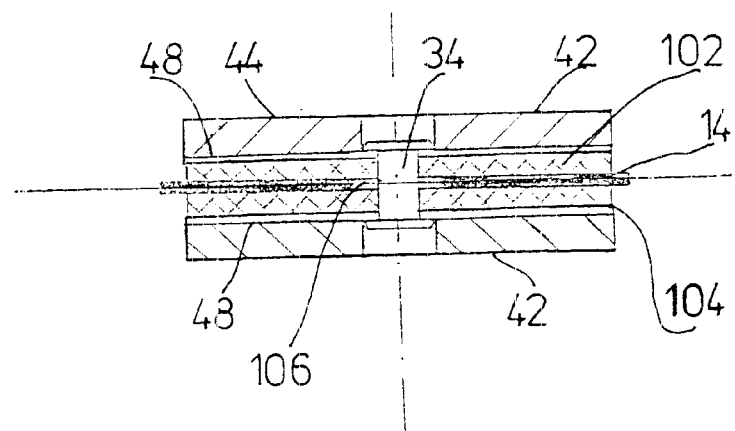
FIG. 17 shows another alternative embodiment of friction lining elements for a clutch disk according to the invention.

Another alternative design for connecting a pair of friction lining elements to, for example, a radially outer area of the cover disk element 14 is illustrated in FIG. 17. The friction lining elements 42 again comprise the friction lining 44, attached to a support part 48. The two support parts 48 of the friction lining elements 42 which are associated with each other are connected by a clinch bolt 34 to the cover disk element 14. Between the support parts 48 and the cover disk element 14 there are layers 102, 104 of elastomeric material. When the frictional relationships change and at least one of the friction lining elements 42 is being carried along with greater force with respect to the cover disk element 14 in the circumferential direction, the associated elastomeric material 102, 104 is deformed in the circumferential direction as a result of the resulting shear action. As a result of this tangential deformation, the normal or contact force transmitted via the elastic material 102 or 104 is reduced accordingly, because, as a result of the shear action, this elastic material 102, 104 shows the basic tendency to change its axial dimension. To allow this shear movement, the clinch bolt 34 is held in a slot-like opening 106 in the cover disk element 14. It is also possible to provide some play for the clinch bolt 34 in the associated friction lining elements 42. It should be pointed out that the friction linings 44 of the friction lining elements 42 can be connected directly by vulcanization to the cover disk element 14 via the intermediate layer of elastic material 102 or 104; or they can be attached to some other support element, which would then be connected to one or both of the cover disk elements 14, 16. Even in the design variant shown in FIG. 17, therefore, it would be possible to use an intermediate support element instead of a direct connection to the cover disk element 14.

Figure 18:
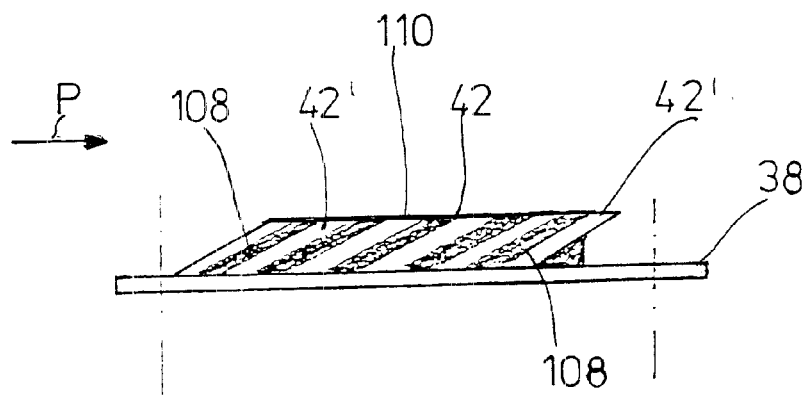
FIG. 18 shows a side view of a friction lining element for a clutch disk according to the invention.
Figure 19:
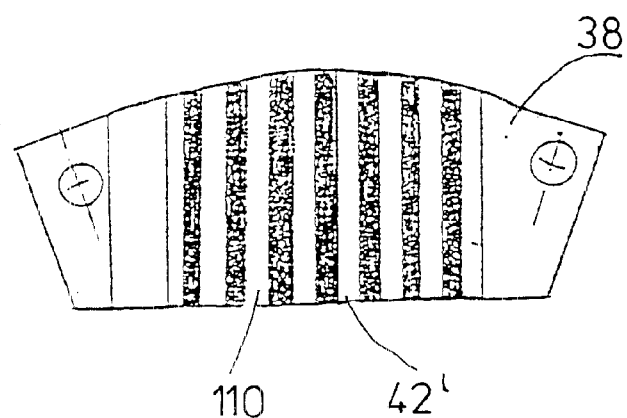
FIG. 19 shows a top or axial view of the friction lining element shown in FIG. 18.

Another type of design according to the invention of a friction lining element for a clutch disk is shown in FIGS. 18 and 19. It can be seen that the friction lining element 42 comprises a plurality of friction lining parts 42', which extend in the axial and circumferential directions relative to a support element 38, which, for example, can again be attached to a cover disk element. Thus, when looked at in the radial direction from the outside, they slant in the circumferential direction as indicated in the figure. Between the individual friction lining elements 42' are layers 108 of elastomeric or elastic material, which can be vulcanized onto the associated friction lining parts 42' and also to the support element 38. The end surfaces 110 of the friction lining parts 42' pointing in the axial direction form the associated friction surface 56. When an opposing friction surface is pulled over this arrangement in the direction of the arrow P, the shear effect is increased, especially when there is a change in the frictional relationships. The result is that the tendency of the elements to slant is increased also, which means that the end surface areas 110 move away from the opposing friction surface, and thus the force which the friction lining elements 42 exert against the opposing friction surface decreases locally. An increase in the coefficient of friction is therefore compensated by a decrease in the normal force. Here it should be mentioned again that this type elastic material can also obviously be provided between the individual friction lining parts 42' and the support element 38.

Figure 20:
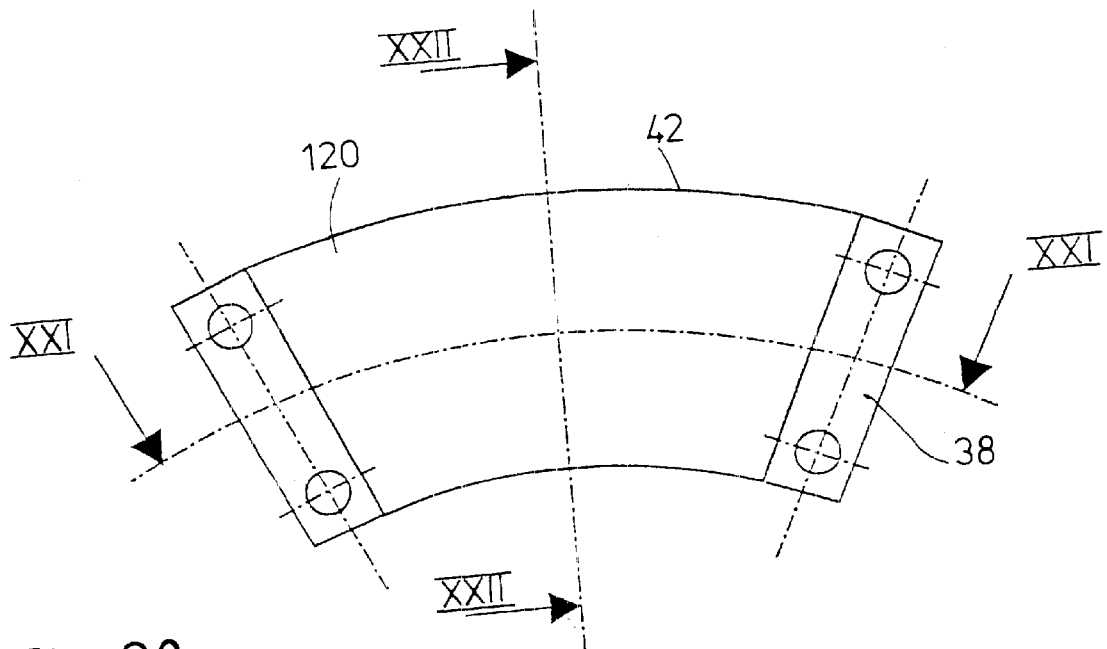
FIG. 20 shows a side view of another friction lining element according to the invention.
Figure 21:
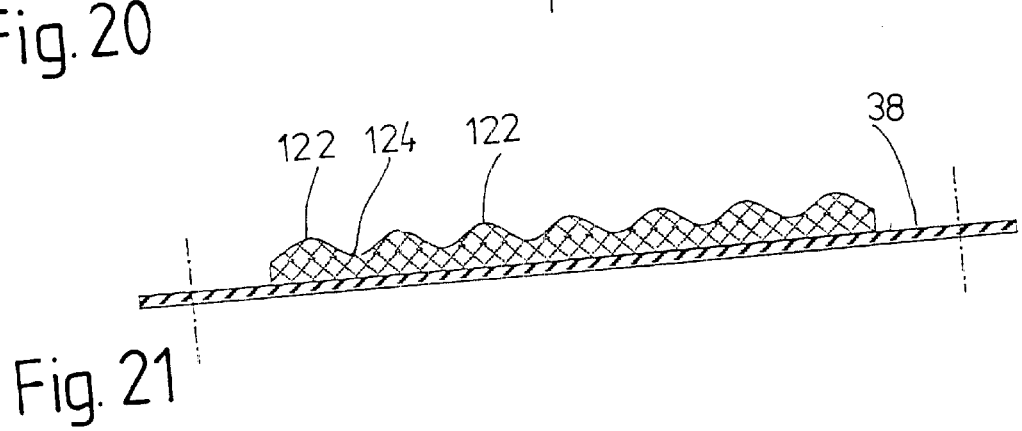
FIG. 21 shows a sectional view of the friction lining element of FIG. 20 along line XXI—XXI of FIG. 20.
Figure 22:
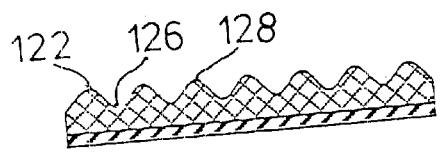
FIG. 22 shows a sectional view of the friction lining element of FIG. 20 along line XXII—XXII of FIG. 20.

Another type of design of a friction lining element 42 according to the invention is shown in FIGS. 20–22. It can be seen that a friction material element 120 is provided on at least one side of a support element 38, which can be fixed in place at its two circumferential ends to, for example, radially outward-projecting connecting tabs, such as those described in conjunction with FIGS. 1–3 by rivets or the like. This friction material element has a plurality of frictional projections 122 and of recessed areas 124 between the projecting areas, arranged in sequence in the circumferential direction. A sinusoidal type of sectional contour, for example, can be provided here. In addition, a design can also be provided in which, in addition to the selected configuration in the circumferential direction, recessed areas 126 are also provided between successive elevations, i.e., the previously described frictional projections, in the radial direction. A bumpy structure is thus obtained with a friction surface 128 on top of each frictional projection, this friction surface being intended to come into contact with an opposing friction surface.

As a result of the frictional projections arranged in sequence in the circumferential direction and preferably also the additional structure in the radial direction, local areas are created which, upon a change in the frictional conditions such as a change in the coefficient of friction on an opposing friction surface, can be locally deformed and can thus help compensate for the change in the frictional conditions.

In this case it is preferable for the recessed areas 124 to be as deep as possible, that is, for them to extend as close as possible to the support element 38, so that, even after a long period of operation and thus after unavoidable wear has occurred, the structure remains preserved. It should be mentioned that these friction material elements 120 can obviously also be attached to both sides of the support element 38.

Figure 23:
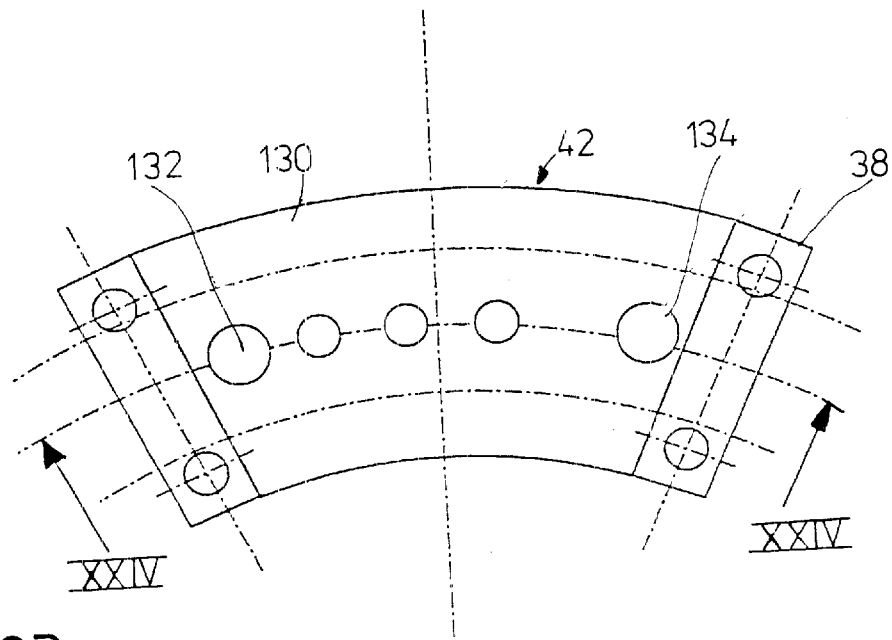
FIG. 23 shows another side view of a friction lining element according to the invention.
Figure 24:
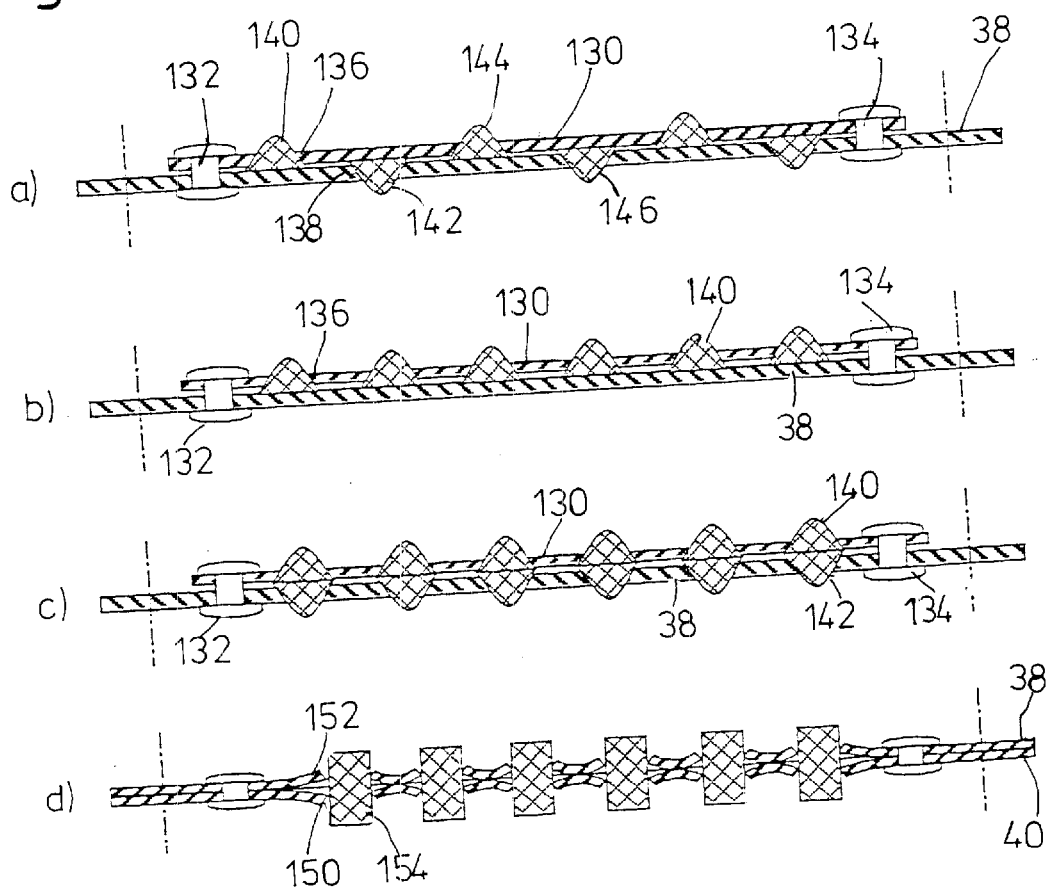
FIGS. 24(a)–(d) are sectional views of the friction lining element of FIG. 23 along line XXIV—XXIV of FIG. 23, illustrating various design possibilities.

Another design variant is shown in FIGS. 23 and 24. Here, too, a support element 38 is provided, to which now, however, a cover element 130 is fixed at both circumferential ends by means of clinch blots 132, 134 or the like.

In the variant shown in FIG. 24(a), openings 136 and 138 are provided in alternation in the cover element 130 and in the support element 38; these openings can have a conical shape, for example. Friction material elements 140, 142 are inserted into these openings in such a way that, after the support element 38 and the cover element 130 have been joined, their rear surfaces are supported against one or the other element, i.e., against either the support element 38 or the cover element 130. The peaks 144, 146 of these separate friction lining elements 140, 142 are thus able to come in contact with an opposing friction surface. The individual, separate friction material elements 140, 142 can be deformed in accordance with the local friction conditions, so that, as also in the design variant described above, peaks in the transmission of axial forces can be absorbed. It is also advantageous here to adopt a design in which there is a small gap between the support element 38 and the cover element 130, which are ultimately pretensioned toward each other so that the individual friction material elements are pressed into their assigned openings 136, 138.

In the variant shown in FIG. 24(b), openings 136 are present only in the cover element 130, so that the friction material elements 140 for frictional interaction are provided on only one axial side. In FIG. 24(c), the friction material elements 140, 142 passing through the cover element 130 and those passing through the support element 38 line up with each other. Thus the backs of the individual friction material elements 140, 142 support each other. A very large area can therefore be covered with friction material elements of this type.

In regard to the design shown in FIGS. 24(a)–(c), it should also be pointed out that the connection to the connecting tabs is preferably accomplished on the same side of the support element 38 as that on which the cover element 130 also rests, so that the total amount of axial space which must be made available can be reduced and/or the axial wear volume can be fully utilized.

In FIG. 24(d), two support elements 38, 40 are provided, which have openings 150, 152 facing each other. Friction material elements 154, which can be cylindrical in shape, for example, are inserted into these openings so that they are held with a press-fit. The press-fit is preferably designed so that the edge areas around the openings 150, 152 are bent slightly upward, which reinforces the retaining effect.

The design variant shown in FIGS. 23 and 24 offers the essential advantage that the individual areas provided for frictional interaction, namely, the individual friction material elements, can be very small, which is advantageous especially when brittle materials are being used, which can be very difficult to shape when large.

Figure 25:
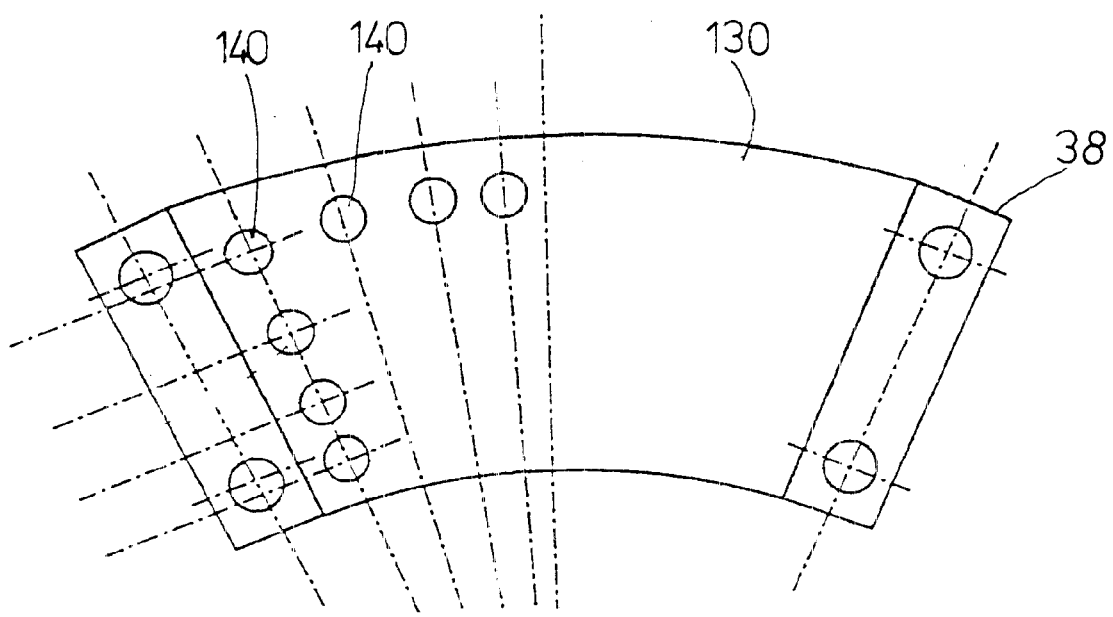
FIG. 25 shows a modification of the design variant shown in FIG. 23.

FIG. 25 shows a modification of the variant shown in FIGS. 23 and 24. It can be seen that here the individual friction material elements, such as those of friction material elements 140, can be different distances apart in the circumferential direction; they can also be staggered in the radial direction and be different distances apart in this direction as well. It should also be pointed out that the individual friction material elements obviously do not have to line up in either the radial or in the circumferential direction; that is, they can also be offset from each other.

Figure 26:
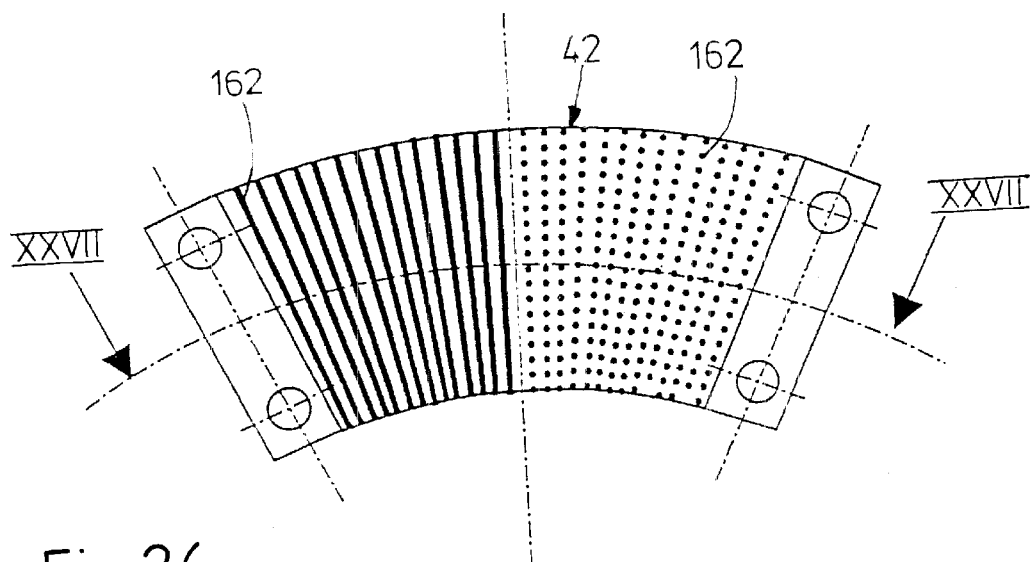
FIG. 26 shows another side view of an alternative design for a friction lining element according to the invention.
Figure 27:
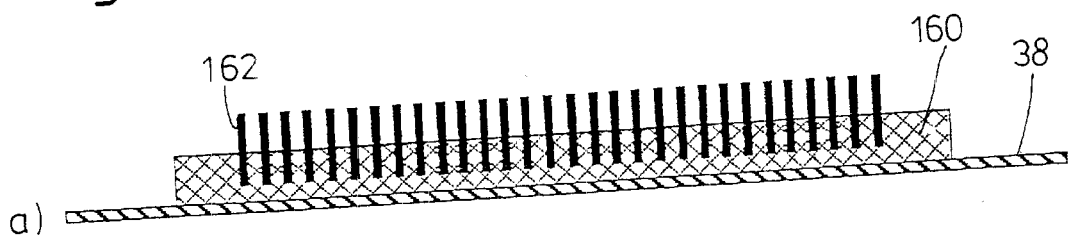
FIG. 27 shows three sectional views (a)–(c) along line XXVII—XXVII of FIG. 26, illustrating different load states.
Figure 27:
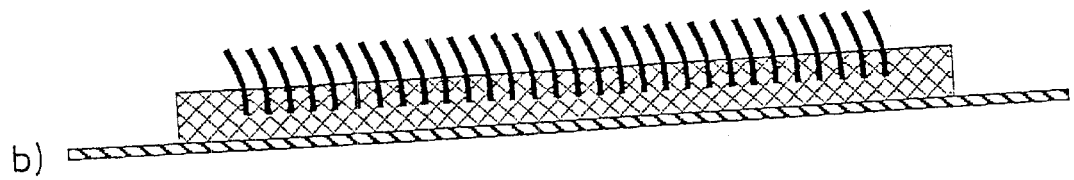
Figure 27:
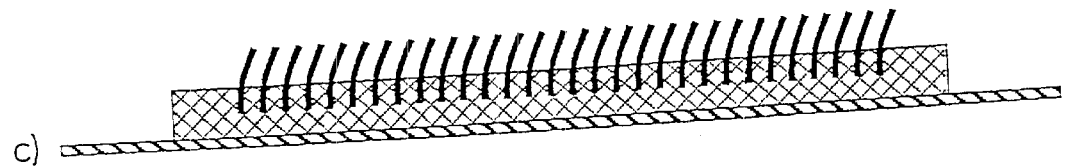

Another design variant of a friction lining element 42 is illustrated in FIGS. 26 and 27. The left and right halves of FIG. 26 show different designs. It can be seen especially in the sectional view of FIG. 27(a) that a plurality of friction material elements 162 is provided in sequence around the circumference on the support element 38 in an embedding material 160. As shown on the left in FIG. 26, these friction material elements 162 can be designed as lips or small plates and can extend radially from the inside outward; or, as shown on the right in FIG. 26, they can consist of individual fibers or bumps, which are firmly embedded in the embedding material 160. When torque is being transmitted, these individual friction material elements 162 are deformed as shown either in FIG. 27(*b*) or in FIG. 27(*c*), depending on the direction in which the torque is being transmitted. Local variations in the coefficient of friction of an opposing friction surface can then be compensated by the greater or lesser deflection or frictional interaction of the individual friction material elements 162, where here a compensating effect is present in both possible directions of torque transmission.

In regard to the design variants described in connection with FIGS. 20–27, it should also be explained that these principles can be applied both in the case of individual friction lining elements 42 and to the case where several of these friction lining elements must be assembled to obtain a complete friction ring. It is equally possible to provide continuous friction rings, which are then designed so that they can undergo local deformation in the area of the friction material elements.

The present invention offers various possibilities for ensuring that, in the event of local or overall changes in the frictional conditions, such as an increase in the coefficient of friction, the torque transmission characteristic remains approximately the same as a result of a decrease in the contact force or normal force of at least one friction lining element against an opposing friction surface. The decrease in the normal force is achieved by giving the individual friction lining elements the tendency to decrease the contact force of their friction surfaces against an opposing friction surface, e.g., by giving certain areas of a friction lining element the tendency to rise or lift and/or to give the support element carrying a friction lining element the ability to undergo at least a local axial deformation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch disk comprising
a hub area having a rotational axis,
a plurality of friction lining elements arranged in sequence in the circumferential direction relative to said rotational axis, each said friction lining element having a friction surface area which is designed to contact an associated opposing friction surface with a sliding frictional interaction and a contact force, and
at least one support element supporting a respective at least one of said friction lining elements relative to said hub so that the contact force of at least part of the friction surface area can change in response to a change in the sliding frictional interaction between the friction surface area and the associated opposing friction surface, each said support element having a pair of circumferentially opposed ends, one of said ends being rigidly attached to said hub area, said support element tending to move at least part of the friction surface area away from the opposing friction surface in response to a change in the sliding frictional interaction between the friction surface area and the associated opposing friction surface.

2. A clutch disk as in claim 1 wherein each said support element deforms so that the friction lining element moves circumferentially away from the end which is rigidly attached to the hub area in response to a change in the sliding frictional interaction between the friction surface area and the associated opposing friction surface.

3. A clutch disk as in claim 1 wherein said support element comprises a curved portion between the connection to the hub area and the friction element, said curved portion curving toward the opposing friction surface.

4. A clutch disk as in claim 3 wherein each said friction lining element is supported against another said friction element to form a pair of friction elements having friction surface areas facing in opposite axial directions.

5. A clutch disk as in claim 4 wherein each of said friction lining elements is supported by a respective said support element, another one of said ends in each said pair being not rigidly attached to the hub area, each said support element being supported against another said support element at the end which is not rigidly attached to the hub area.

6. A clutch disk as in claim 3 wherein both of said circumferential ends of each said support element are rigidly attached to the hub area.

7. A clutch disk as in claim 1 wherein one of said circumferential ends of each said support element is connected to said hub area with freedom to move relative to the hub area in the circumferential direction.

8. A clutch disk as in claim 1 wherein said support element is one of pivotable and elastically deformable between said connection to said hub area and said friction lining element, said friction surface area being offset axially toward the associated opposing friction surface.

9. A clutch disk as in claim 1 wherein each of said support elements supports a plurality of friction lining elements thereon, said plurality of friction lining elements being at least one of circumferentially and radially arranged.

10. A clutch disk as in claim 2 wherein each said support element is connected to said hub area by a sliding wedge arrangement which allows said support element to move axially relative to said hub area.

11. A clutch disk as in claim 10 wherein each of said friction lining elements is supported by a respective said support element, each said support element being supported elastically against another said support element to form a pair and being loaded toward an associated opposing friction surface, each said support element and said hub area each having wedge surfaces which cooperate so that at least part of each said support element can move axially toward the other support element of the pair when there is a change in the sliding frictional interaction on at least one of the friction lining elements of the pair.

12. A clutch disk as in claim 1 wherein said means for supporting at least one of said friction lining elements relative to said hub comprises an elastic support mass.

13. A clutch disk as in claim 12 wherein said at least one friction lining element comprises a plurality of friction lining element parts extending in the axial and circumferential direction, said friction lining element parts having axial end surfaces which form at least part of said friction surface area, said elastic support mass comprising a plurality of elastic support mass parts which are interleaved with said friction lining element parts.

14. A clutch disk as in claim 1 wherein said at least one of said friction lining elements comprises a plurality of axially extending frictional projections for frictional interaction.

15. A clutch disk as in claim 14 wherein said at least one of said friction lining elements comprises a friction material lining on which said plurality of axially extending frictional projections are formed, said projections being arranged in sequence in at least one of an axially and circumferentially extending direction.

16. A clutch disk as in claim 14 wherein said plurality of axially extending frictional projections on each said at least one friction lining element are formed separately, said projections being arranged in sequence in at least one of an axial and radial direction.

17. A clutch disk as in claim 16 wherein said projections are in the form of one of lips and bumps.

18. A clutch disk as in claim 1 further comprising means for limiting axial motion of the friction lining element relative to the hub area.

19. A clutch disk as in claim 1 wherein said at least one friction lining element exerts a pressure which can be changed essentially independently of the other friction lining elements.

20. A clutch disk as in claim 1 wherein said hub area comprises a plurality of radially outward extending tabs, said one of said pair of circumferentially opposed ends of each said support element being rigidly attached to a respective one of said tabs.

21. A friction clutch comprising a clutch disk, said clutch disk comprising a hub area having a rotational axis, a plurality of friction lining elements arranged in sequence in the circumferential direction relative to said rotational axis, each said friction lining element having a friction surface area which is designed to contact an associated opposing friction surface with a sliding frictional interaction and a contact force, and at least one support element supporting a respective at least one of said friction lining elements relative to said hub so that the contact force of at least part of the friction surface area can change in response to a change in the sliding frictional interaction between the friction surface area and the associated opposing friction surface, each said support element having a pair of circumferentially opposed ends, one of said ends being rigidly attached to said hub area, said support element tending to move at least part of the friction surface area away from the opposing friction surface in response to a change in the sliding frictional interaction between the friction surface area and the associated opposing friction surface.

* * * * *